July 5, 1932.  W. P. BRADFORD  1,865,824
VALVE
Filed Dec. 30, 1930
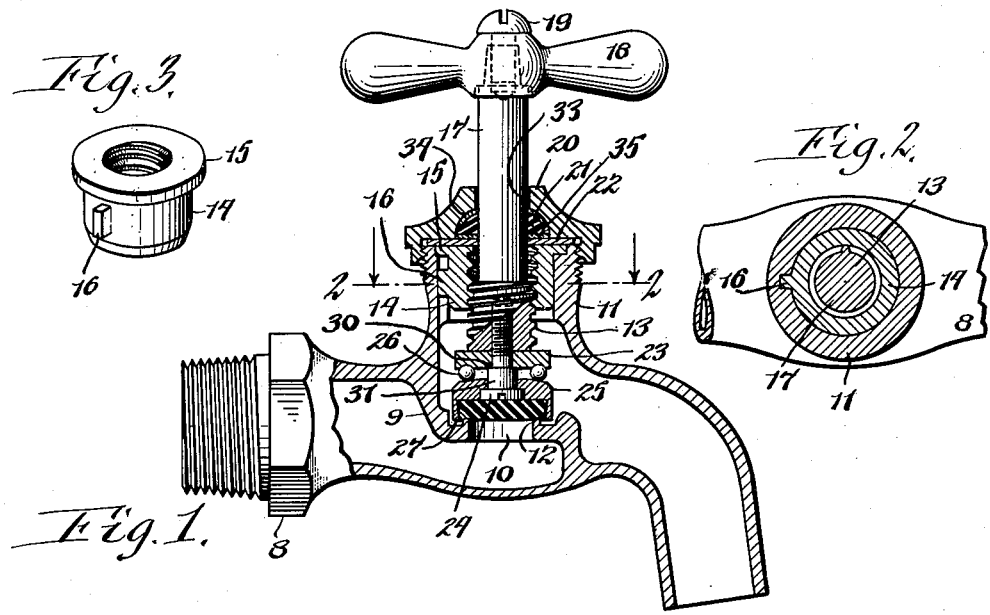
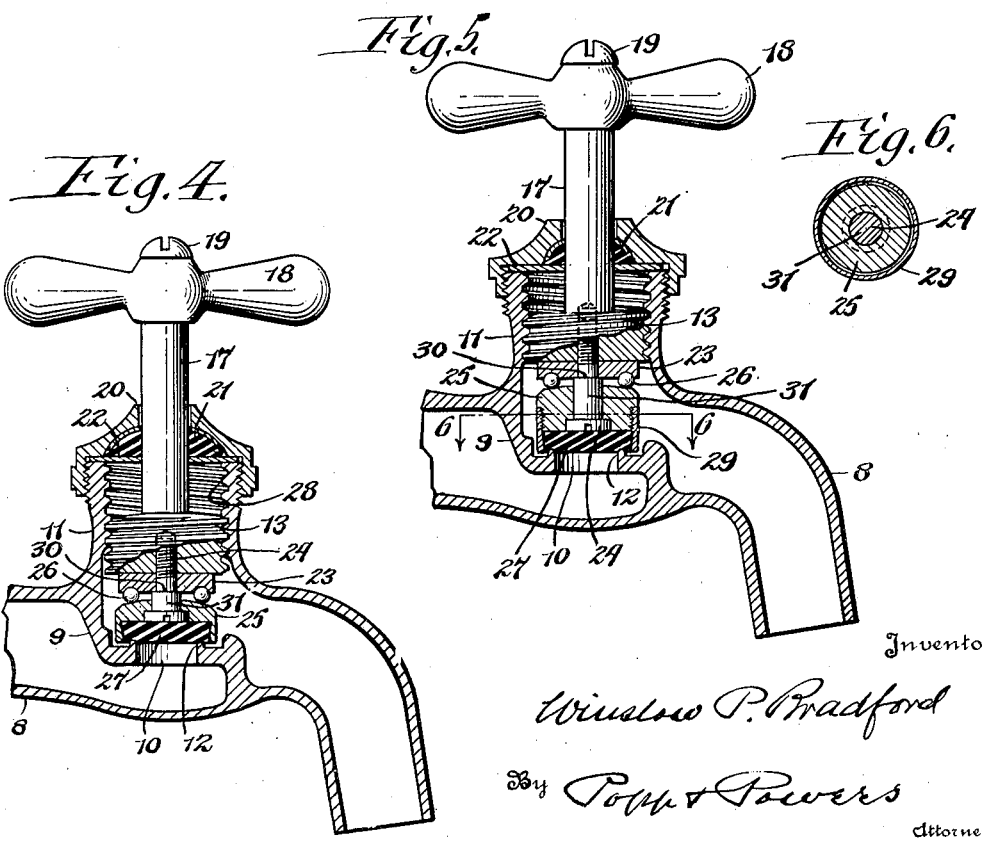

Patented July 5, 1932

1,865,824

UNITED STATES PATENT OFFICE

WINSLOW P. BRADFORD, OF BUFFALO, NEW YORK

VALVE

Application filed December 30, 1930. Serial No. 505,557.

This invention relates to a faucet for domestic use such as the faucets shown and described in my Patent No. 1,760,810, May 27, 1930.

The principal object of the present invention is to provide a faucet in which there is a minimum of wear and in particular eliminates all grinding wear between the seat and the packing washer which seats thereon, thus indefinitely lengthening the life of the faucet, insuring a smooth action in cutting off the water supply and insuring complete closing off of the water when the faucet is turned off, thereby avoiding dripping and loss of water and in the case of hot water effecting a considerable saving in gas.

Another aim is to provide such a faucet which can be produced at extremely low cost, thereby permitting it to be marketed in competition with standard faucets which do not have the wearing and service qualities of the present invention. To permit of this low cost production the present invention is composed of few parts which are easily and quickly asembled and require no expensive machinery operations and no highly accurate fitting of the parts. The weight of the faucet and particularly the special alloy parts which resist corrosion is low and the faucet requires no particular skill to take apart and repair should any repairs be required after a long period of service.

Another purpose is to so design the faucet that such parts as require special machining such as the threaded valve stem, can be made of soft metal such as brass; and those parts such as the races which are required to be hard to resist wear, do not require special machining.

Another object is to permit of embodying the invention in faucets of the same shape, size, operation and capacity as corresponding faucets of standard construction thereby avoiding any departure from standard practice in point of operation.

Another aim is to provide a valve in which the adjustments such as the spacing of the races are obtained through one member, namely the screw which holds the parts together.

In the accompanying drawing:—

Figure 1 is a vertical, longitudinal section, partly in elevation of a faucet embodying my invention.

Figure 2 is a fragmentary section taken on line 2—2, Figure 1.

Figure 3 is a perspective view of the threaded nut employed in the form of the invention shown in Figures 1 and 2.

Figures 4 and 5 are views similar to Figure 1 showing modifications of the invention.

Figure 6 is a horizontal section taken on line 6—6, Figure 5.

In its general organization the invention comprises a valve body having the usual diaphragm and port and having a screw stem by means of which the packing washer is forced down upon the seat surrounding the port to shut off the flow of water. To avoid grinding or turning of the washer upon the seat and consequent rapid wearing, the washer is rotatably mounted on the valve stem, a roller bearing is interposed between the stem and the washer so that the moment the washer frictionally engages the valve seat it ceases to turn and the continued turning of the valve stem in compressing the washer on its seat is taken by the ball bearings.

In the form of the invention shown in Figures 1–3 the valve body 8 is of the usual form, being threaded at one end to screw into the water supply pipe and also having an integrally formed diaphragm 9 and port 10 above which the body is formed to provide an externally threaded boss 11. Surrounding the port 10 is a raised valve seat 12 on which the packing washer is forced to cut off the flow of water through the port 10.

A removable internally threaded nut 14 is fitted into the boss 11. This nut is generally of cylindrical form and is formed to provide a collar 15 at its upper end which fits into a corresponding recess in the upper end of the boss. This collar 15 is of such thickness that its upper face is flush with the upper end of the boss 11 when it is placed in position. The nut 14 is also provided at one side with an integrally formed feather or key 16 which fits into a corresponding vertical keyway in one side of the boss 11 so that when the nut is inserted in the boss it is prevented from turning.

The valve stem 17 is preferably made of brass or a soft metal and is enlarged at its lower end to form a cylindrical part as indicated at 13 and this enlarged lower end is externally threaded to screw into the nut 14 so that as the stem is turned it is moved up or down. To turn the valve stem it is squared at its upper end in the usual manner and over this squared end is fitted the handle 18 which is held in place by means of a screw 19. Around the stem 17 is fitted a cap 20 which houses a packing 21 of rubber, felt or the like. It frequently happens, particularly in replacements, that the valve stems 17 are of different sizes or diameters. When an off size valve stem is encountered, the hole 33 in the cap 20 is, of course, either too large or too small, resulting in the packing 21 gradually squeezing out or in the reaming of the hole 33. To avoid this, the hole 33 is made oversize to fit the largest variation of valve stem, and a thin pressed metal cup or thimble 34 is fitted over the valve stem 17 before the packing 21 is placed in position. This thimble is arranged around the stem 17 between the opening 33 and the packing 21 and thereby prevents the soft packing 21 from gradually squeezing out through the oversize opening 33. Since the thimble 34 is made of soft sheet metal, it can be forced on even the largest variation of valve stem even though it is designed to fit the smallest variation. At the bottom of the packing is arranged rubberized fabric or fiber washer 35, and below this is arranged another larger washer 22 which can be made of steel and is held between the cap 20 and the top of the boss 11. Since the top of the nut 14 is flush with the top of the boss 11, the top of this nut 14 is also pressed against the washer 22 and this insures against leakage of water through or around the cap.

The lower or inner enlarged threaded end 13 of the stem 17 is flattened and an upper disk shaped ball bearing race member 23 is secured thereto, this upper ball race member being held in position between the threaded shank and a shoulder 30 formed by an enlargement 31 of a screw 24. The lower ball race member 25 is revolvably mounted on this enlarged lower end of the screw 24 and is prevented from dropping off by screw head which is set into the lower ball race member. Between the two ball race members 23 and 25 an annular row of ball bearings 26 is interposed, these balls riding in an annular groove in the upper ball race member 23 and riding on a conical or rounded surface formed on the upper face of the lower ball race member 25. By so forming the two ball race members, any sediment in the water is prevented from settling on the bearing surfaces of either ball race member 23 or 25 but is washed off thereby materially increasing the life of the ball bearing.

In order to prevent rust or corrosion of these parts, particularly the ball race members 23 and 25, these are either made of a rust and corrosion resistant metal or alloy or are chromium or cadmium plated to insure their preservation. By making the upper ball race member 23 separate from the valve stem it will be observed that a hard corrosion resistant alloy or plated metal can be used for the ball race member, whereas a soft easily machined metal can be used for the valve stem, this requiring a threading operation which would, of course, be more costly if the metal were hard.

It is desirable that the maximum distance between the washer 22 and the top of the screw 13 (when the valve is closed) be less than the maximum distance between the bottom of the nut 14 and the top of the upper ball race member 23. By these proportions, the ball race member 23 can never come in contact with the bottom of the nut 14 since the screw 13 would first engage the washer 22. In this manner, there is no tendency for the screw 24 to loosen or be unscrewed when the valve is opened which would be the case if the ball race member 23 contacted with a stationary part in opening.

It is also apparent that the length of the enlargement 31 determines the spacing of the ball race members and so determines the adjustment of the ball bearing, this enlargement at the same time forming the shoulder 31 for securing the upper ball race member 23 to the valve stem and against rotation relative thereto.

The packing washer 27 which seats upon the seat 12 to cut off the flow of water through the port 10 and thereby shut off this faucet is carried by the lower ball bearing race member 25. For this purpose the underside of the lower ball bearing race member is recessed and the sides of the recess converge inwardly toward its open end so that when the packing washer 27 is forced into the recess it is firmly held therein.

The modified form of the invention shown in Figure 4 is similar in all respects to the form shown in Figure 1 except that the nut 14 and its steel washer are eliminated and the threads 28 in which the threads of the stem 17 work are formed directly on the interior of the boss 11.

The modified form of the invention shown in Figures 5 and 6 is exactly similar to that shown in Figure 4 except that instead of making the lower ball bearing race member and washer holder 25 in one piece, it is externally threaded and a collar 29 is screwed over the ball race member. This collar is bevelled on its inner side so that when it is tightened down around the packing washer 27 it holds the washer firmly in place and prevents its loss.

In all of the forms of the invention when the stem 17 is turned down, the lower ball race member 25 and the packing washer 27 which it holds is moved toward the seat 12. The moment the washer 27 frictionally engages the seat 12, it stops turning and the continued rotation of the stem 17 and upper race member 23 is taken by the balls 26. In this manner the packing washer 27 is not ground down upon the seat 12 and its life is extended indefinitely.

In all the forms of the invention shown it will be observed that extremely accurate machining operations upon the parts are eliminated, the parts are nevertheless quickly and easily fitted to one another and reliably held in their operative position and there is no danger of the faucet becoming inefficient through failure of proper operation or through accumulation of sediment on its working parts. It will also be observed that by making the upper ball race member separate from the valve stem, the valve stem can be made of soft metal which is more easily threaded and machined than the hard corrosive resistant metal of which the ball race member must be made.

I claim:

1. A faucet including a body having a valve seat, a valve stem having an integrally formed threaded end operatively connected with said body, a ball bearing race member abutting the end of said threaded end, a second ball bearing race member, balls interposed between said race members, a screw extending through said race members and having threaded engagement with said stem, said screw having an enlargement forming a shoulder which engages said first race member and holds it against said stem and a packing washer carried by said second bearing member and adapted to engage said seat.

2. A faucet including a body having a valve seat, a valve stem having an enlarged integrally formed threaded cylindrical part operatively connected with said body and the inner end thereof being flat, a disk shaped ball bearing race member arranged against the flat end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem and a packing washer carried by said second race member and adapted to engage said seat.

3. A faucet including a body having a valve seat, an internally threaded nut fitted into said body and held against turning therein, a valve stem having an integrally formed threaded cylindrical part having threaded engagement with said nut and the inner end thereof being flat, a disk shaped ball bearing race member arranged against the flat end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem and a packing washer carried by said second race member and adapted to engage said seat.

4. A faucet including a body having a valve seat, an internally threaded nut fitted into said body and held against turning therein, a valve stem having an integrally formed threaded cylindrical part having threaded engagement with said nut and the inner end thereof being flat, a disk shaped ball bearing race member arranged against the flat end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem, a packing washer carried by said second race member and adapted to engage said seat, and a packing cap carried by said body and surrounding said valve stem and retaining said nut in said body.

5. A faucet including a body having a valve seat, a valve stem having an enlarged integrally formed threaded cylindrical part operatively connected with said body and the inner end thereof being flat, a disk shaped ball bearing race member arranged against the flat end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem, a packing washer carried by said second race member and adapted to engage said seat and means for holding said washer in position comprising a recess formed in one face of said second ball bearing race member and having its sides converge inwardly toward its open end whereby when said washer is pressed into said recess it is held in position.

6. A faucet including a body having a valve seat, a valve stem having an enlarged integrally formed threaded cylindrical part operatively connected with said body and the inner end thereof being flat, a disk shaped ball bearing race member arranged against the flat end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem, a packing washer carried by said second race member and adapted to engage said seat and means for holding said washer in position comprising a ring fitted to said second race member and having its inner face converging inwardly toward its open end to prevent displacement of the washer fitted therein.

7. A faucet including a body having a valve seat, a valve stem having an operative threaded engagement with said body, an upper ball bearing race member engaging the end of said stem, a lower ball bearing race member below said upper face member, balls interposed between said ball race members, means for holding said ball race members together and to permit their relative rotation and a packing washer carried by said lower ball race member and adapted to engage said seat, said upper ball race member being provided with an annular groove adapted to retain said balls and the opposing face of the lower ball race member being substantially conical whereby sediment is prevented from interfering with the operation of said balls.

8. A faucet including a body having a valve seat, a valve stem having an enlarged integrally formed threaded cylindrical part operatively connected with said body and the inner face thereof being flat, a disk shaped upper ball bearing race member arranged against the flat end of said stem and having an annular groove in its under side, a lower ball bearing race member having a substantially conical face on its upper side, balls arranged in said groove and engaging the conical face of said lower race member, a screw extending through said race members and having threaded engagement with said stem, said screw having a head engaging and holding said second race member in position and also having an enlarged portion forming a bearing for said second race member and a shoulder which engages said first race member and holds it against said stem and a packing washer carried by said second race member and adapted to engage said seat.

9. A faucet including a body having a valve seat, a valve stem having a threaded end operatively connected with said body, a ball bearing race member abutting the end of said threaded end, a second ball bearing race member, balls interposed between said race members, a screw extending through said race members and having threaded engagement with said stem, said screw having a head engaging and holding said second race member in position and also having an enlarged cylindrical portion connected with said head and forming a bearing for said second race member and also a shoulder which engages said first race member and holds it against rotation relative to said stem and said enlargement and also determining the spacing of said race members and a packing carried by said second race member and adapted to engage said seat.

10. A faucet including a body having a valve seat, an internally threaded nut fitted into said body and held against turning therein, a valve stem having an integrally formed threaded cylindrical part having threaded engagement with said nut, a packing cap carried by said body and surrounding said valve stem and retaining said nut in said body, a disk shaped ball bearing race member arranged against the end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem and a packing washer carried by said second race member and adapted to engage said seat, said cylindrical portion engaging said cap when said faucet is fully opened and thereby preventing the upper race member from engaging said nut and loosening said screw.

11. A faucet including a body having a valve seat, an internally threaded nut fitted into said body and held against turning therein, a valve stem having an integrally formed threaded cylindrical part having threaded engagement with said nut and the inner end thereof being flat, a disk shaped ball bearing race member arranged against the flat end of said stem, a second ball bearing race member, balls interposed between said race members, a screw extending through said race members and having threaded engagement with said stem, said screw having a head engaging and holding said second race member in position and also having an enlarged portion forming a bearing for said second race member and a shoulder which engages said first race member and holds it against said stem, a packing washer carried by said second race member and adapted to engage said seat, and a packing cap carried by said body and surrounding said valve stem and retaining said nut in said body, a washer surrounding said stem and held between said cap and said body, a soft packing between said washer and cap and a soft metal thimble surrounding said stem and interposed between said cap and said soft packing and preventing the escape of said packing.

In testimony whereof I hereby affix my signature.

WINSLOW P. BRADFORD.